United States Patent
Neuhaeuser et al.

(10) Patent No.: US 11,150,116 B2
(45) Date of Patent: Oct. 19, 2021

(54) MOUNTING DEVICE FOR HOLDING A SENSOR, AND METHOD FOR MOUNTING AND ADJUSTING A SENSOR

(71) Applicant: SICK AG, Waldkirch (DE)

(72) Inventors: Torsten Neuhaeuser, Waldkirch (DE); Manuel Krüger, Waldkirch (DE)

(73) Assignee: SICK AG, Waldkirch (DE)

( * ) Notice: Subject to any disclaimer, the term of this patent is extended or adjusted under 35 U.S.C. 154(b) by 64 days.

(21) Appl. No.: 16/746,295

(22) Filed: Jan. 17, 2020

(65) Prior Publication Data
US 2020/0232827 A1 Jul. 23, 2020

(30) Foreign Application Priority Data
Jan. 18, 2019 (DE) ...................... 10 2019 101 273.2

(51) Int. Cl.
*G01D 11/30* (2006.01)
*G01D 11/18* (2006.01)

(52) U.S. Cl.
CPC ............. *G01D 11/30* (2013.01); *G01D 11/18* (2013.01)

(58) Field of Classification Search
CPC ...... G01D 11/30; G01D 11/245; G01D 11/24; G01D 11/305; G01N 29/225
See application file for complete search history.

(56) References Cited

U.S. PATENT DOCUMENTS

2005/0204833 A1* 9/2005 Wekluk .............. F16M 11/2092
73/866.5
2016/0047678 A1* 2/2016 Impidjati ............... G01D 11/30
403/325

FOREIGN PATENT DOCUMENTS

| DE | 40 33 860 A1 | 4/1992 |
| DE | 10 2011 011 897 A1 | 8/2012 |
| EP | 2985573 A1 | 2/2016 |

OTHER PUBLICATIONS

Office Action dated Sep. 12, 2019 issued in corresponding to German Application No. 10 2019 101 273.2.

* cited by examiner

*Primary Examiner* — Peter J Macchiarolo
*Assistant Examiner* — Anthony W Megna Fuentes
(74) *Attorney, Agent, or Firm* — Nath, Goldberg & Meyer; Jerald L. Meyer

(57) ABSTRACT

To enable fine adjustment of a sensor in a mounting device, a mounting device is provided for holding the sensor in an operating position. The mounting device comprises a base body having a first through-hole, a holding member having a second through-hole. The sensor is held in these through-holes by displacement of the holding member versus the base body and shifting the through-holes out of alignment. The holding member comprises an adjustment element, in particular a thread, which engages with an outer surface of the sensor in such a way that, when the sensor is rotated about a sensor central axis, the adjustment element causes the sensor to move along the central axis.

10 Claims, 5 Drawing Sheets

MOUNTING DEVICE FOR HOLDING A SENSOR, AND METHOD FOR MOUNTING AND ADJUSTING A SENSOR

FIELD

The invention concerns a mounting device for holding a sensor in an operating position having a base body which has a first through-hole and can be fastened to a holder, at least one holding element, which has a second through-hole and is movably arranged in the base body in such a way that the holding element can be displaced between a first and second position and a holding position. The first and second through-hole is non-aligned with one another in the first position, in the second position the first and second through-holes are aligned with each other, and in the holding position the holding element presses the sensor provided in the first and second through-holes against the base body.

BACKGROUND

Nowadays, sensors that measure physical or chemical quantities are used in many different applications. The sensors are mounted in an operating position. This requires mounting devices that hold the sensors.

From EP 2 985 573 A1 a fastening device is known as outlined above. In particular, the said mounting device comprises a mounting base with a through-hole with which the sensor inserted in the through-hole can be mounted in the operating position. The mounting base has a fixation slider with a through-hole. The fixation slider can be moved between a first and a second position.

When the fixation slider is moved to the first position, the through-hole of the mounting base and the through-hole of the fixation slider are aligned so that the sensor can be inserted through the through-holes. The fixation slider can be moved to the second position by the spring force of a spring, whereby the fixation slider presses the sensor against the mounting base so that the sensor is held in the operating position by the mounting device.

The described mounting device has the disadvantage that a fine adjustment of the sensor in the mounting device is not possible if, for example, the mounting device holds the sensor in a position that deviates from or is at a distance from the required operating position. This means that if the mounting device positions the sensor too close to or too far away from an area to be detected by the sensor, the mounting device must be loosened and remounted.

DE 40 33 860 A1 reveals a holding device for positioning a sensor with respect to a body, the holding device comprising a support body in which the sensor is arranged and a lever-shaped actuator rotatable with respect to the support body. The support body is fastened to the body by means of a fastener on a holder. The lever-shaped actuator is toothed with the support body so that a distance between the sensor and the body can be changed by turning the actuator.

DE 10 2011 011 897 A1 reveals a holder for the longitudinally displaceable adjustment of at least one sensor, which has a carriage in which the sensor is arranged and fixed. The carriage is attached to the bracket by means of a screw and can be moved by loosening the screw.

SUMMARY

It is therefore an object of the invention to improve a mounting device for holding a sensor in an operating position in such a way that a fine adjustment of the sensor in the mounting device is possible.

The object is solved by a mounting device having a base body which has a first through-hole and can be fastened to a holder, at least one holding element which has a second through-hole and is movably arranged in the base body in such a way that the holding element can be displaced between a first and second position and a holding position, the first and second through-hole being non-aligned with one another in the first position and the first and second through-hole being aligned with one another in the second position, and in the holding position the holding element presses the sensor provided in the first and second through-bore against the base body, wherein an adjustment element is provided at the second through-bore which adjustment element directed radially inwards which adjustment element engages with an outer surface of the sensor in such a way that, when the holding element is in an adjustment position located between the second position and the holding position, the sensor is rotatable about a sensor central axis and, when the sensor is rotated, the adjustment element causes the sensor to move along the central axis.

This has the advantage that in the adjustment position the sensor can be easily rotated without tools, whereby the sensor is fine-adjusted in its position. In particular, the inclination of the adjustment element relative to the central axis of the second through-hole causes the adjustment element to act as a screw conveyor and thus pushes the sensor in one direction or the other.

According to a preferred embodiment, the sensor comprises a male thread on the outer surface that engages the adjustment element, or a cylindrical sensor. This enables precise adjustment, as the adjustment element is guided along the external thread of the sensor. In the case of a cylindrical sensor, the outer surface of which has no external thread, the outer surface is preferably formed from deformable material so that the adjusting element can engage the outer surface in order to cause the sensor to be shifted along the central axis of the sensor when the sensor is rotated. In particular, the deformable material consists of plastic.

Furthermore, according to a preferred embodiment, the adjusting element consists of a number of non-continuous partial threads, which occupy part of a circumference of an inner side of the second through-hole, so that manufacture or provision of the adjusting element in the fastening device is limited to part of the holding element. This has the advantage that in the second position of the retaining element, the first and second through-holes are centered on each other in such a way that the adjusting element, i.e. the partial threads, would be countersunk relative to the first through-hole. This means that the sensor can be inserted through both through-holes without a possible interference contour. Advantageously, the adjustment element is located on one side of the inside of the second through-hole, which is closer to the second position than to the first position.

According to another preferred embodiment, a height of the partial threads is selected such that a distance between a profile tip of a thread tooth and an opposite inner side of the second through-hole corresponds to a diameter of the first through-hole. This makes it possible to completely countersink the adjustment element with respect to the first through-hole when the holding element is moved to the second position, so that the sensor is not obstructed by any disturbing contour when inserted through the first and second through-holes.

Furthermore, according to a preferred design example, at least one spring is provided in the base body, which pushes the holding element into the first position. The spring is preferably designed as a flat spring or a flat wave spring.

In particular, according to a preferred embodiment, a fixing element is provided which supports the holding element in the base body or additionally increases a pretension of the holding element relative to the base body or presses through the base body and the holding element onto the sensor when the holding element is in the holding position. This prevents the holding element from being accidentally pushed out of the holding position. The mounting element preferably comprises a screw, in particular a grub screw.

It is also an object of the invention to provide a method for mounting and adjusting a sensor in an operating position by means of a mounting device which allows fine adjustment of the sensor in the mounting device.

The object is solved according to the inventive subject matter by a method for mounting and adjusting a sensor in an operating position by means of a mounting device as described above and comprises the steps of Moving the retaining element to the first position, Inserting the sensor into the mounting device through the first and second through-holes, Moving the holding element to the third position so that the adjustment element is in contact with the outer surface of the sensor, Rotating the sensor around the center axis of the sensor to fine-adjust the sensor in the operating position; and Moving the holding element to the second position so that the holding element presses the sensor against the base body.

The fixing device according to the inventive subject matter and the method can be designed in a similar way with further features having similar advantages. Such further features are exemplary described in the dependent claims.

BRIEF DESCRIPTION OF THE DRAWINGS

The invention is also explained below with regard to further advantages and features with reference to the attached drawing using exemplary embodiments. The figures of the drawing show in.

DETAILED DESCRIPTION

Figure 1:
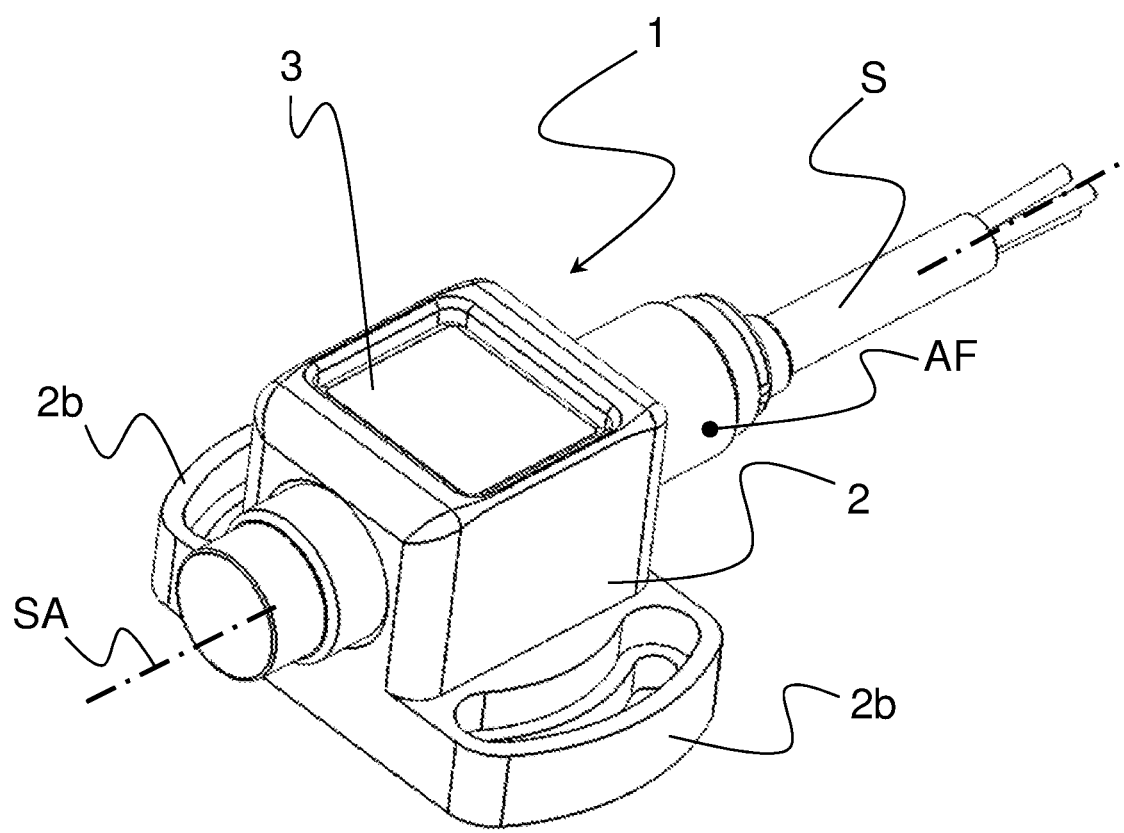
FIG. 1 a schematic perspective of a preferred first embodiment of a fastening device according to the invention with a sensor, FIG. 2 a schematic perspective representation of the first embodiment without the sensor, FIG. 3 another schematic perspective of the first embodiment without the sensor, FIG. 4 a perspective sectional view of the first embodiment, FIG. 5 a side cut view of the first embodiment and FIG. 6 a schematic perspective of a preferred second embodiment of a fastening device according to the invention with a sensor.

FIG. 1 shows a schematic perspective of a preferred first embodiment of a fastening device 1 according to the invention in which a sensor S is mounted. Here the fastening device 1 comprises a base body 2, which has two flange sections 2b in the first example. Via the two flange sections 2b, the base body 2 or the fastening device 1 can be fastened to a, preferably stationary, not shown bracket, so that the sensor S is mounted in its operating position. However, the flange sections 2b can be omitted if the base body 2 is cuboid and is to be glued or welded to the bracket, for example.

Furthermore, the fastening device 1 comprises a holding element 3, which is arranged in a recess of the base body 2.

Figure 2:
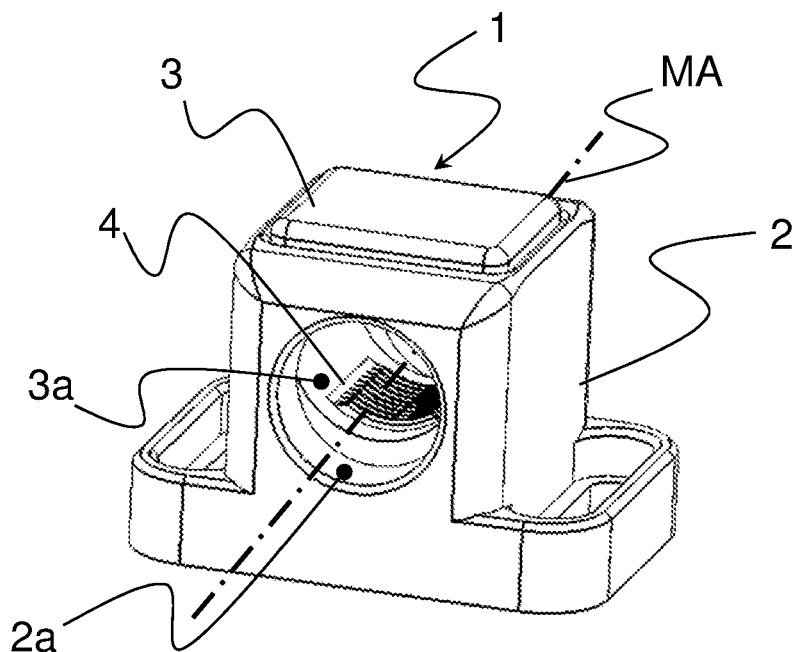
Figure 3:
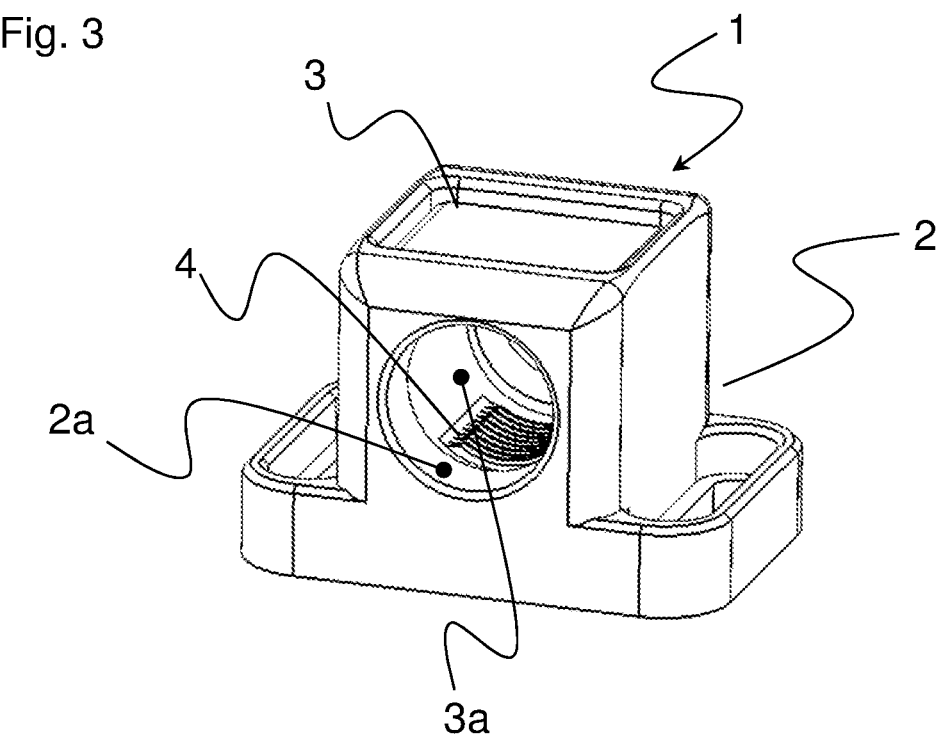

As shown in FIG. 2, which shows a perspective representation of the first embodiment without the sensor S, the base body 2 has a first through-hole 2a. The retaining element 3 has a second through-hole 3a and is movably arranged in the base body 2 in such a way that the retaining element 3 can be moved between a first position as shown in FIG. 2 and a second position as shown in FIG. 3.

In the first position of retaining element 3, the first and second through-holes 2a and 3a are not aligned. This means that it is not possible to insert the sensor S into the mounting device 1 in this first position of the retaining element 3. In the second position of the retaining element 3, as shown in FIG. 3, the first and second through-holes 2a and 3a are aligned so that in this second position of the retaining element 3 the sensor S can be inserted into the fastening device 1 or removed.

In addition, the holding element 3 can be displaced into a holding position, as shown in FIG. 1, in which the holding element 3 presses the sensor S provided in the first and second through-holes 2a and 3a against the base body 2, so that the sensor S is in the operating position.

In accordance with the invention, an adjusting element 4, which is directed radially inwards and in particular inclined relative to a central axis MA of the second through-hole 3a, is provided at the second through-hole 3a. The adjusting element 4 is in engagement with an outer surface AF, as shown in FIG. 1, of the sensor S in such a way that, when the holding element 3 is in an adjusting position situated between the second position and the holding position, the sensor S is rotatable about a sensor central axis SA and, when the sensor S is rotated, the adjusting element 4 causes the sensor S to move along the central axis MA.

In other words, in the adjustment position of the retaining element 3, the adjusting element 4 projects so far into the first through-hole 2a that the adjusting element 4 engages the outer surface AF of the sensor S, whereby the sensor S cannot be removed from the mounting device 1. At the same time, the adjustment element 4 does not engage so strongly with the outer surface AF of the sensor S that the sensor S is not pressed against the base body 2 by the holding element 3. This keeps the sensor S rotatable.

Preferably the sensor S is a sensor, meaning that the external surface AF of the sensor S has an external thread. The adjustment element 4 engages in the external thread of the external surface AF of the sensor S, so that by turning the sensor S the adjustment element 4 and the external thread interact and shift the sensor S. If the sensor S inserted in the mounting device 1 is not yet in an optimum operating position—i.e. the sensor S is still too far away from or too close to the area to be detected—the sensor S can be rotated, whereby the sensor S is moved by the adjustment element 4 in one or the other direction along the center axis MA of the second through-hole 3a. This allows the sensor S in the mounting device 1 to be fine adjusted to the optimum operating position.

In case the sensor S has just a cylindrical outer surface, the outer surface AF has no external thread the outer surface AF of the sensor S is made of deformable material. This enables the adjustment element 4 to intervene in the deformable outer surface AF of the sensor S and to carry out the above described effect when turning the sensor S. The adjustment element 4 is therefore able to adjust the deformable outer surface AF of the sensor S and to carry out the above described effect when turning the sensor S. The adjustment element 4 can also be used to adjust the deformable outer surface AF of the sensor S.

After adjustment, the holding element 3 can be moved into the holding position so that the holding element 3 presses the sensor S against the base body 2 via the adjustment element 4 and holds the sensor S securely in the operating position.

Figure 4:
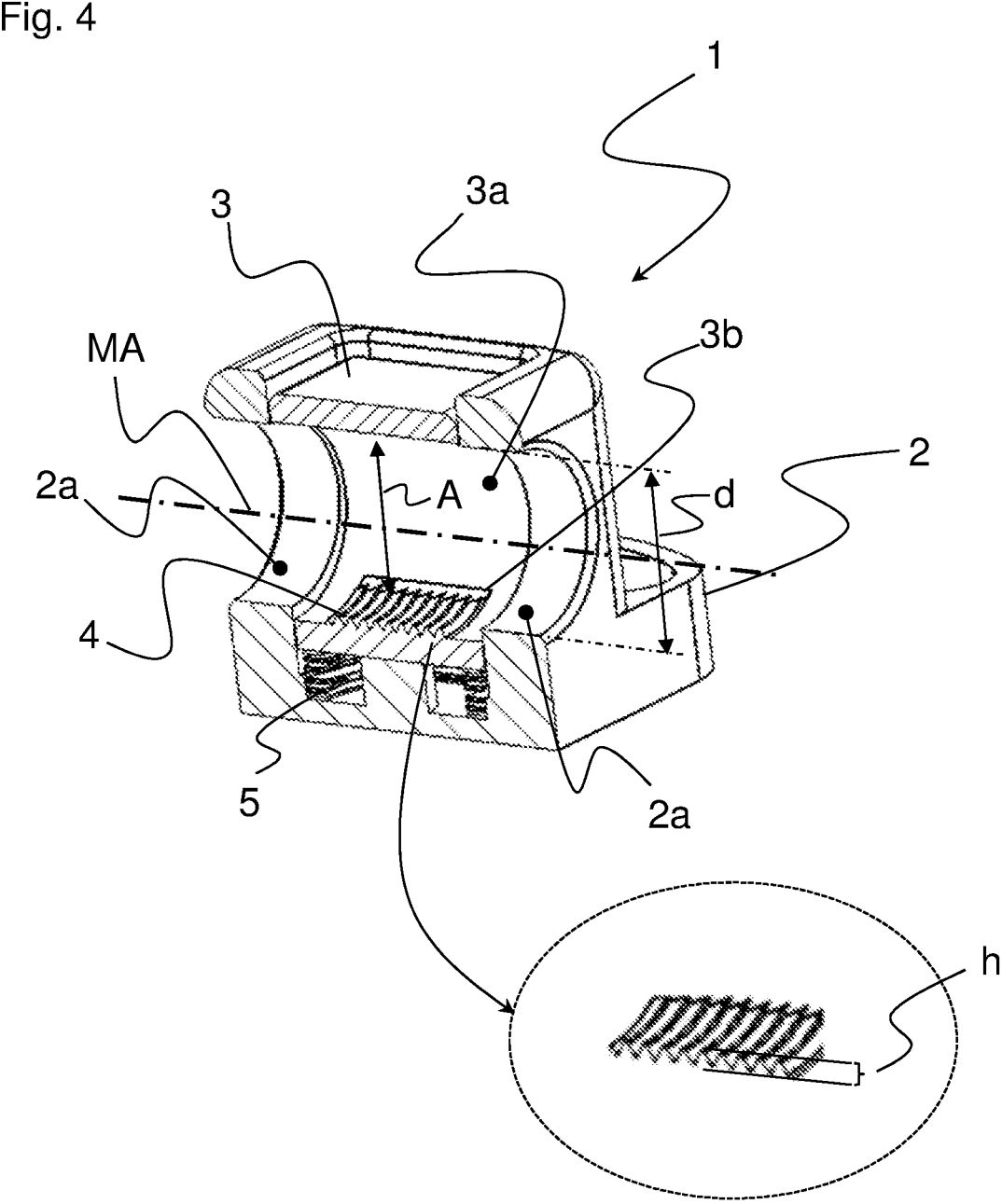

FIG. 4 shows a perspective cross-sectional view of the first embodiment of the fastening device 1 along the central axis MA of the second through-hole 3. The retaining element 3 is in the second position so that the first and second through-holes 2*a* and 3*a* are aligned with each other. The adjustment element 4 preferably consists of a number of non-continuous partial threads which occupy a part 3*b* of a circumference of an inner side of the second through-hole 3*a*. Part 3*b* can be about a quarter of the circumference.

The adjusting element 4 or the partial threads are located on one side of the inside of the second through-hole 3*a*, which is closer to the second position than to the first position. This means that the adjustment element 4 is provided on the side opposite to the inside of the first through-hole 2*a* where the holding element 3 presses the sensor S when the holding element 3 is in the holding position. Thus the adjustment element 4 not only supports the pressure on the sensor S against the base body 2, but also prevents an unwanted possible relative movement of the sensor S along the central axis MA of the second through-hole 3*a*, since the adjustment element 4 engages in the outer surface AF of the sensor S. The adjustment element 4 is mounted on the outer surface AF of the sensor S. The adjustment element 4 is mounted on the sensor S.

In addition, as shown in the enlarged detail view of the adjusting element 4, a height h of the adjusting element 4 or the partial threads is selected such that a distance A between a profile tip of a threaded tooth and an opposite inner side of the second through-hole 3*a* corresponds to a diameter d of the first through-hole 2*a*.

In other words, when the holding element 3 is moved to the second position, the adjustment element 4 is countersunk opposite the first through-hole 2*a*. This means that the adjustment element 4 does not form a disturbing contour if the sensor S is inserted through the first and second through-holes 2*a* and 3*a* into the mounting device 1. If the holding element 3 is moved to the holding position, then the adjustment element 4 engages in the outer surface AF of the sensor S and additionally presses the sensor S against the inside of the first through-hole 2*a* of the base body 2.

If the holding element 3 is in the adjustment position, then the adjustment element 4 protrudes into the first through-hole 2*a* so far that the sensor S can no longer be pulled out.

In addition, the inclination of the adjustment element 4 is selected in such a way that the flatter the inclination relative to the center axis MA of the second through-hole 3*a* is, the finer the adjustment of the sensor S is.

Furthermore, the base body 2 has at least one spring 5 which is arranged in the base body 2 in such a way that the spring 5 presses the holding element 3 into the first position. The spring 5 is preferably designed as a flat spring or as a flat wave spring and arranged below the retaining element 3 so that the retaining element 3 is springloaded. This means that the retaining element 3 must be pressed against a spring force of the spring 5 in order to move the retaining element 3 to the second position.

Figure 5:
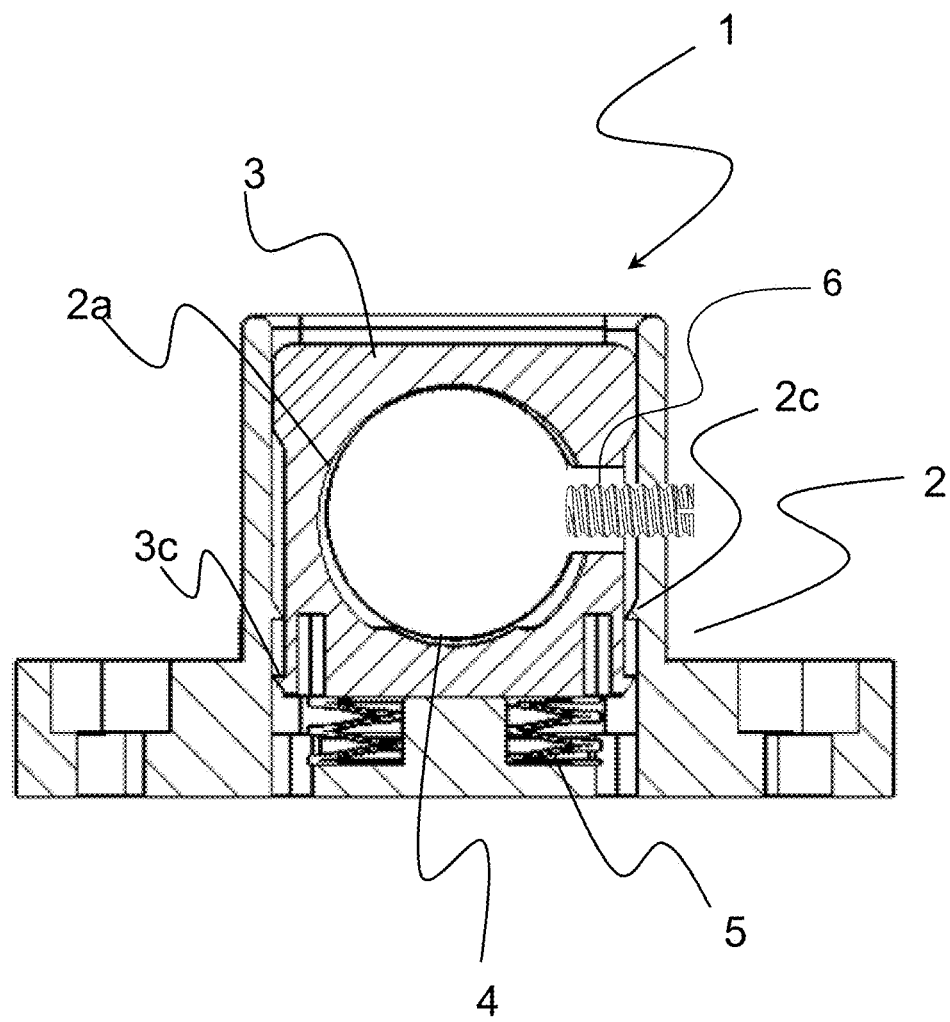

As shown in FIG. 5, which shows a sectional view of the first example of the design of the fastening device 1 along a sectional plane perpendicular to the central axis MA of the second through-hole 2*a*, an edge 2*c* is provided inside the recess of the main body 2 in which the retaining element 3 is movably arranged. The edge 2*c* is directed radially inwards and comes into contact with the corresponding hook 3*c* provided on the retaining element 3 when the retaining element 3 is in the first position. This ensures that the retaining element 3 remains in the base body 2 and is not pushed out of the base body 2 by the spring force of the spring 5.

In addition, FIG. 5 clearly shows that the adjustment element 4, as described above, is designed so that in the second position of the holding element 3 the first through-hole 2*a* and the second through-hole 3*a* including the adjustment element 4 are aligned with each other, so that the sensor S can be inserted into the fastening device 1 without obstruction.

The profile tip of the thread teeth of the adjustment element 4 complete the inner circumference of the second through-hole 3*a*. If the retaining element 3 is released after the sensor S has been inserted, the spring 5 pushes the retaining element 3 back into the first position so that the retaining element 3 together with the adjusting element 4 presses the sensor S against the inside of the first through-hole 2*a* and thus against the base body 2 and holds the sensor S in the operating position.

This means that the following procedure is used for mounting and adjusting the sensor S into the operating position. The holding element 3 is pressed from the first position against the spring force of the spring 5 into the second position. This aligns the first and second through-holes 2*a* and 3*a* with each other. The sensor S is inserted through the first and second through-holes 2*a* and 3*a*.

The retaining element 3 continues to be moved into the adjustment position against the spring force of the spring 5, with the adjustment position between the second position and the retaining position. In the adjustment position, the adjustment element 4 projects into the first through-hole 2*a* so far that the first and second through-holes 2*a* and 3*a* are no longer aligned, so that the sensor S can no longer be removed from the fastening device 1 and the holding element 3 does not yet press the sensor S against the base body 2. This means that the sensor S can still be rotated in this adjustment position of the retaining element 3.

If the sensor S is not yet in the optimum operating position, the sensor S is finely adjusted in its position by rotating the sensor S around the sensor center axis SA. The adjusting element 4 acts similar to a screw conveyor and pushes the sensor S along the central axis MA of the second through-hole 3*a* according to a direction of rotation of the sensor S around the sensor central axis SA, so that the sensor S is moved continuously at very fine increments closer to or further away from the detection area of the sensor S.

When the fine adjustment is completed, the holding element 3 is moved into the holding position so that the holding element 3 presses the sensor S against the base body 2 by means of the spring force of the spring 5 and holds the sensor S in the set position in the fastening device 1 by means of the adjustment element 4.

Figure 6:
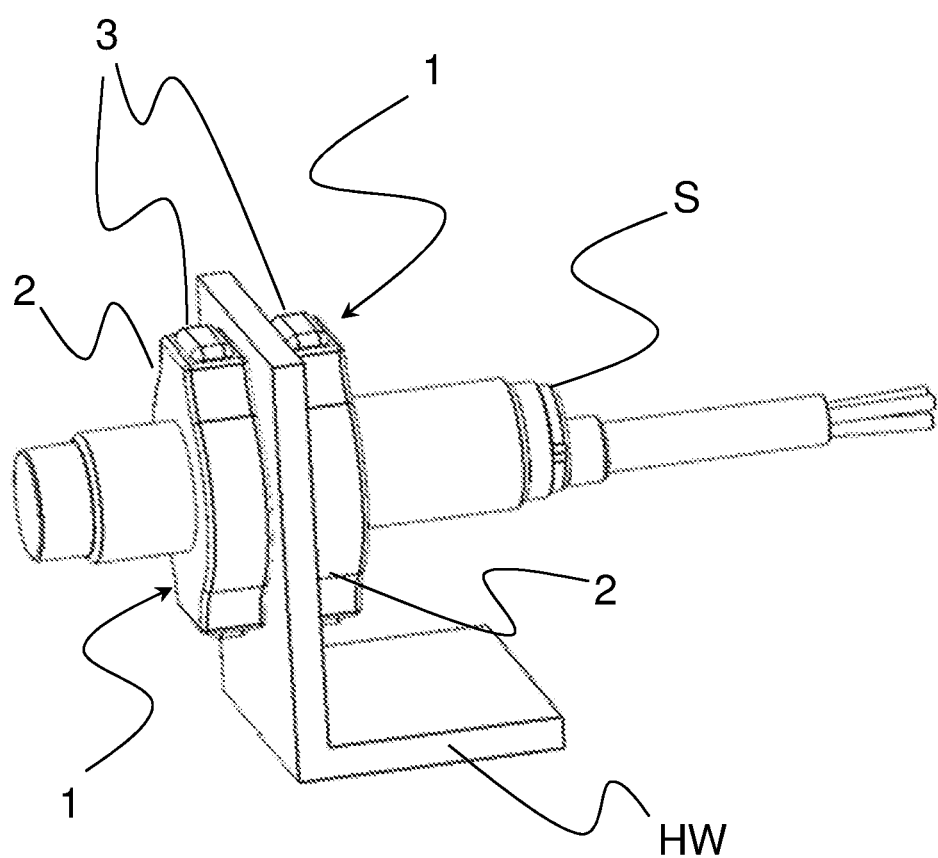

FIG. 6 schematically shows a second preferred embodiment of the fastening device 1. In the second embodiment, the base body 2 of the fastening device 1 does not have flange sections 2*b*, which can be used to mount the fastening device 1 to the bracket.

In this design example, two mounting devices 1 are used to mount the sensor S on a mounting bracket HW.

This makes use of two nuts for mounting the sensor S on the mounting bracket HW unnecessary, whereby the nuts are screwed onto the sensor S on different sides of the mounting bracket HW.

Each fastening device 1 of the second embodiment comprises the base body 2 with the first through-hole 2a described above and the retaining element 3 with the second through-hole 3a described above. The holding element 3 is movably arranged in the base body 2.

In other words, apart from the flange sections 2b, the fixing device 1 of the second embodiment does not differ from the fixing device 1 of the first embodiment. In this way, the sensor S can be inserted into the two mounting devices 1 shown and mounted to the mounting bracket HW in the same way as described above. In this case, of course, one mounting device 1 must first be mounted on the sensor S on one side of the mounting bracket HW and then the other mounting device 1 on the other side of the mounting bracket HW.

The fine adjustment of the sensor S can then be achieved by adjusting the optimum operating position by means of a mounting device 1, whereby the second mounting device 1 is then used for fixing the fine adjusted sensor S to the mounting bracket HW.

For a fast mounting, two retaining elements 3 are provided on opposite sides of the base body 2, preferably in the second embodiment of the mounting device 1, so that the mounting device 1 can be quickly pulled onto the sensor S by simultaneously pressing the two retaining elements 3. Here, one of the two holding elements 3 is preloaded by means of a spring so that, by pressing the spring preloaded holding element 3, the second through-holes 3a of the holding elements 3a are aligned with the first through-hole 2a, the non-spring loaded holding element 3 being passively pressed along.

Alternatively, both retaining elements 3 can also be preloaded symmetrically by a spring, so that the two retaining elements 3 can be pressed equally hard.

In addition, a fixing element 6 (FIG. 5), which is not shown here, is provided in particular for the first and second embodiments of the fastening device 1, which presses the holding element 3 against the base body 2, so that the holding element 3 is additionally braced relative to the base body 2. A thread through the holding element 3 in the direction of the base body 2 is provided for this purpose, the thread being provided next to the second through-hole 3a and perpendicular to the center axis MA of the second through-hole 3a.

The fixing element 6 is screwed through the thread or through the retaining element 3 on the base body 2, so that the retaining element 3 is additionally supported on the base body 2. This gives the sensor S in the mounting device 1 a very high shock and vibration resistance, so that the sensor S cannot be adjusted from its adjusted operating position.

Preferably a thread can also be provided laterally through the base body 2 and an elongated hole in the holding element 3, so that the fixing element 6, for example a screw, in particular a grub screw, is screwed into the base body 2 in such a way that the screw presses through the base body 2 and movably in the elongated hole of the holding element 3 onto the sensor S when the holding element 3 is in the holding position. This also improves the shock and vibration resistance of the sensor S in its adjusted operating position.

It is advantageous that the base body 2 and the holding element 3 are made of different materials, so that different frictions act on the sensor S. Here, the adjustment element 4 can be made of soft material, for example plastic, applied to the inner surface of the second through-hole 3a, in particular sprayed or glued on. This would simplify the fabrication of holding element 3.

The invention claimed is:

1. Mounting device (1) for holding a sensor (S) in an operating position, comprising:
    a base body (2) which has a first through-hole (2a) and can be fastened to a holder,
    at least one holding element (3), which has a second through-hole (3a) and is movably arranged in the base body (2) in such a way that the holding element (3) can be displaced between a first and second position and a holding position, the first and second through-hole (2a and 3a) being non-aligned with one another in the first position, in the second position the first and second through-holes (2a and 3a) are aligned with each other, and in the holding position the holding element (3) presses the sensor (S) provided in the first and second through-holes (2a and 3a) against the base body (2), characterized in that an adjusting element (4) being directed radially inwards is provided on the second through-hole (3a) and is in engagement with an outer surface (AF) of the sensor (S) in such a way that, when the holding member (3) is in an adjustment position located between the second position and the holding position, the sensor (S) is rotatable about a sensor center axis (SA) and when the sensor (S) is rotated, the adjustment member (4) causes the sensor (S) to move along the sensor center axis (SA).

2. The mounting device (1) according to claim 1, characterized in that the sensor (S) comprises a sensor with an external thread on the outer surface (AF), in which the adjusting element (4) engages, or a cylindrical sensor.

3. The mounting device (1) according to claim 1, characterized in that the adjusting element (4) consists of a plurality of non-continuous partial threads which occupy a part (3b) of a circumference of an in-side of the second through-hole (3a).

4. The mounting device (1) according to claim 3, characterized in that the adjusting element (4) is located on one side of the in-side of the second through-hole (3a) which is closer to the second position than to the first position.

5. The mounting device (1) according to claim 3, characterized in that a height (h) of the partial threads is selected such that a distance between a profile tip of a thread tooth and an opposite inner side of the second through-hole (3a) corresponds to a diameter (d) of the first through-hole (2a).

6. The mounting device (1) according to claim 1, characterized in that at least one spring (5) is provided in the base body (2), which presses the holding element (3) into the first position.

7. The mounting device (1) according to claim 1, characterized in that a fixing element is provided, in that the holding element (3) is screwed to the base body (2) or presses onto the sensor (S) through the base body (2) and the holding element (3) when the holding element (3) is in the holding position.

8. The mounting device (1) according to claim 7, characterized in that the fixing element comprises a screw.

9. The mounting device (1) according to claim 7, characterized in that the fixing element comprises a grub screw.

10. A method for mounting and adjusting a sensor (S) in an operating position by means of a mounting device (1), comprising the steps of:
- moving a holding element (3) to a second position,
- inserting the sensor (S) into the mounting device (1) through first and second through-holes (2*a* and 3*a*),
- moving the holding element (3) to an adjustment position so that an adjustment element (4) is in engagement with a outer surface (AF) of the sensor (S),
- rotating the sensor (S) about a sensor center axis (SA) to fine-tune the sensor (S) in the operating position, and
- moving the holding element (3) into a holding position so that the holding element (3) presses the sensor (S) against a base body (2).

* * * * *